United States Patent

Lang et al.

[11] Patent Number: 5,860,351
[45] Date of Patent: Jan. 19, 1999

[54] HYDRAULIC STEERING ARRANGEMENT

[75] Inventors: Armin Lang; Wilfried Leutner, both of Schwabisch Gmund; Helmut Knodler, Lorch, all of Germany

[73] Assignee: ZF Friedrichshafen AG, Friedrichshafen, Germany

[21] Appl. No.: 602,839

[22] PCT Filed: May 24, 1994

[86] PCT No.: PCT/EP94/01657

§ 371 Date: Mar. 26, 1997

§ 102(e) Date: Mar. 26, 1997

[87] PCT Pub. No.: WO94/27855

PCT Pub. Date: Dec. 8, 1994

[30] Foreign Application Priority Data

May 27, 1993 [DE] Germany .......... 43 17 625.9

[51] Int. Cl.[6] .............. F15B 11/08; F15B 1/26; B62D 5/06
[52] U.S. Cl. ................. 91/446; 60/466
[58] Field of Search .......... 60/461, 466; 91/441, 91/446

[56] References Cited

U.S. PATENT DOCUMENTS

| | | | |
|---|---|---|---|
| 2,401,258 | 5/1946 | Livers | 91/446 |
| 2,924,200 | 2/1960 | Hanna et al. | 91/446 |
| 4,518,010 | 5/1985 | Mucheyer et al. | 60/413 |

FOREIGN PATENT DOCUMENTS

| | | | |
|---|---|---|---|
| 3227953 | 2/1984 | Germany . | |
| 59-34976 | 2/1984 | Japan . | |
| 61-48601 | 3/1986 | Japan . | |
| 580368 | 11/1977 | U.S.S.R. | 91/446 |
| 2208376 | 3/1989 | United Kingdom . | |

*Primary Examiner*—Sheldon J. Richter
*Attorney, Agent, or Firm*—Larson & Taylor

[57] ABSTRACT

A hydraulic steering arrangement with a steering device (2) and an oil tank (3) which are connected with each other via a supply line (5) and a return line (6), wherein a hydraulic pump (1) is integrated into the supply line (5), has an oil reservoir (7) communicating with the return line (6) and a backpressure valve (8) opening in the direction toward the oil tank (3), which is disposed between the oil tank (3) and the oil reservoir (7).

13 Claims, 2 Drawing Sheets

HYDRAULIC STEERING ARRANGEMENT

FIELD OF THE INVENTION

The invention relates to a hydraulic steering arrangement with a steering device and an oil tank which are connected with each other via a supply line and a return line, wherein a hydraulic pump is integrated into the supply line and wherein an oil reservoir communicating with the return line and a backpressure valve, which opens in the direction toward the oil tank and is disposed between the oil tank and the oil reservoir, are provided.

DESCRIPTION OF THE PRIOR ART

If oil flows from the oil tank to the cylinder chambers of hydraulic steering arrangements, for example those of rugged, large motor vehicles, the pressure difference between the return pressure and the underpressure in the cylinder is often not sufficient to fill the cylinder chamber sufficiently rapidly with oil. A vacuum is generated by this.

As a result, knocking noises occur, particular with rapid steering changes.

In conventional circulating systems the continuous oil flow generates a certain return pressure because of throttle resistance in the return line or in the cylinder of the oil tank. The oil for filling the cylinder chambers does not come from the oil tank, instead it is diverted from the flow-through of oil.

In systems with a closed center (for example CC steering), the conditions are different. Since the oil does not flow in a continuous cycle, it is necessary for oil to flow out of the oil tank for steering in case of re-suction. If, because of flow losses, the cylinder is not sufficiently filled, knocking noises can also occur during the sudden pressure increase in the cylinder.

It is therefore the object of the instant invention to provide a hydraulic steering arrangement of the type mentioned at the outset, which avoids the mentioned disadvantages, is simply structured and operates dynamically.

SUMMARY OF THE INVENTION

This object is attained in accordance with the invention in that the oil reservoir is embodied as a piston reservoir with a piston and prestressing by means of a spring.

In this case the backpressure valve is used to provide a pressure reservoir. Because of this, oil can flow more rapidly into the underpressure chambers of the cylinder of the steering device, in particular in case of rapid steering changes or a sudden pressure rise in the cylinder of the steering device, and therefore no longer causes knocking noise.

When the storage volume of the oil reservoir in accordance with the invention is exceeded, surplus oil flows into the oil tank.

Spring prestressing is provided in this way, by means of which it is possible for the oil to reach the pressure chambers of the cylinder of the steering device better and a little faster. In the process, the backpressure valve causes the generation of back pressure in the oil reservoir against the spring.

In addition, during rapid steering movements the piston can be lifted by the oil flowing back into the oil tank only against the spring force of the spring. In the process the oil in the return line is put under pressure.

It is furthermore of advantage if the backpressure valve is integrated into the oil reservoir.

It can be provided in a further embodiment of the invention that openings toward the oil tank result after a defined travel of the piston of the oil reservoir.

This can be realized in that, for example, bores are disposed in the cylindrical wall of the piston reservoir which cooperate with the piston in the piston reservoir in such a way that the oil from the oil reservoir can flow off into the oil tank only after a defined piston travel and a pressure build-up in the return line have been reached, i.e. when the piston bottom reaches the bores.

Channels, grooves or other recesses can also be used as openings in place of bores.

Because of this embodiment in accordance with the invention, the oil reservoir is used to store the oil and simultaneously to create a pressure reservoir.

The gap between the piston and the cylindrical wall of the piston reservoir can be kept very narrow, so that the oil reaches the oil tank only slowly and evenly through the openings.

An advantageous embodiment of the invention also consists in that the chamber in which the prestressing spring for the piston is disposed is provided with an equalization bore.

Because of this, oil can flow from the oil tank into the oil reservoir or the spring chamber for equalization when the spring is relaxed again.

It is advantageous if the chamber in which the spring for the piston is disposed is closed off by a cover. The cover is advantageously screwed on. The equalization bore is suitable located in the center of the cover.

A simply constructed oil reservoir is created in this way, which can be easily disassembled if, for example, it is intended to replace the spring or the piston.

The oil reservoir can be advantageously installed in different variations in the return line.

In this way it is possible to integrate the oil reservoir directly into the return line.

But it is also possible to install the oil reservoir in the steering device.

It is furthermore possible to install the oil reservoir in the interior of the oil tank or to place it on the top of it.

These possible ways of installation depend on the spatial conditions available for the hydraulic steering arrangement.

In a further embodiment of the invention it can be provided that a check valve is installed into the oil reservoir.

The check valve allows oil to flow from the oil tank to the steering device when needed. In place of the separate installation of a check valve, for forming a check valve it is advantageously possible to provide the bottom of the piston with an opening into which a closure member, loaded by another spring, can be pushed.

The closure member is pushed into the opening by the spring under weak prestress.

If the pressure in the steering device falls below the pressure present in the oil tank, the closure member, for example a valve cone, is pushed downward and the oil flows from the oil tank into the steering device.

It can be furthermore provided in those cases where the oil reservoir is installed in or placed on the oil tank turned by 180°, i.e. when the return line terminates from above in the oil reservoir and the equalization opening in the cover of the oil reservoir points downward, that there is a ball as the closure member.

In this variant the actual bottom of the piston represents the upper front face of the piston. This upper front face of the piston is suitably provided with a centrally arranged opening, on which the ball is placed as the closure member. In this case the ball operates under its own weight and in this way constitutes a very simply constructed check valve.

In this case it is possible to do without the spring and the valve cone used in the already described variant of the formation of a check valve.

It is therefore possible in an advantageous manner to create a simply constructed and satisfactorily acting closure member.

It is furthermore advantageous if the return line has a restriction or a retaining member upstream of the ball.

In this way the ball is maintained in its position and, in case of underpressure, is prevented by the retaining member or the restriction from being pushed out.

In a simple manner a pin extending crosswise through the return line can be selected as the retaining member.

An exemplary embodiment will be described in principle below by means of the drawings.

DETAILED DESCRIPTION OF THE PREFERRED EMBODIMENTS

Figure 2:
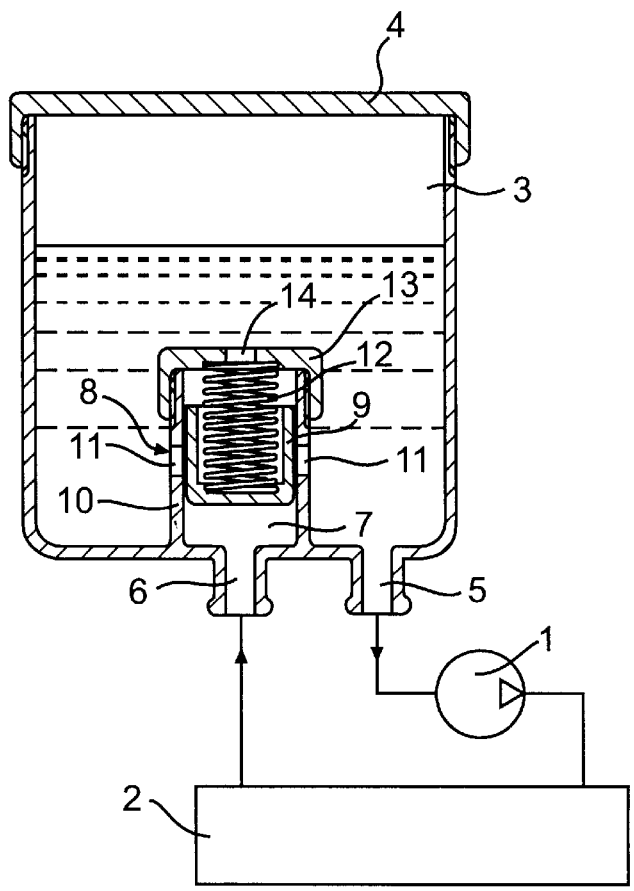
FIG. 2, a longitudinal sectional representation of the hydraulic steering arrangement in accordance with the invention with the oil reservoir installed in the oil tank.
Figure 4:
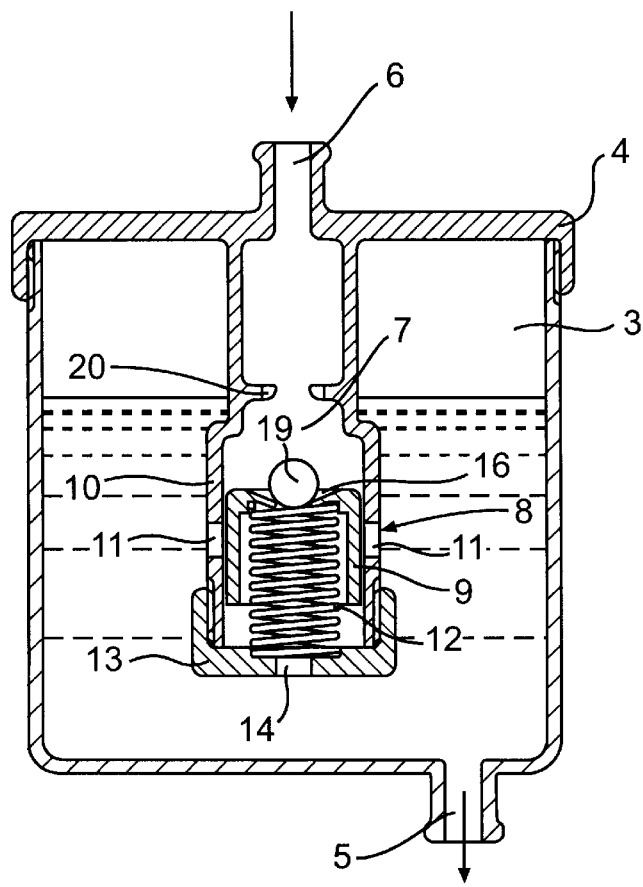

A hydraulic steering arrangement (with closed center) consists of a hydraulic pump 1, a steering device 2 and an oil tank 3. As can be seen in FIGS. 2 and 4, the oil tank 3 can be closed by means of a cover 4. It is suitably screwed on the oil tank 3.

The oil tank 3 is connected with the steering device 2 via a supply line 5 for the aspirated oil and a return line 6 for the returning oil. The oil tank 3 is provided with appropriate connectors for this purpose. An oil reservoir 7 is connected so it communicates with the return line 6.

A backpressure valve 8 operates between the oil tank 3 and the oil reservoir 7. It is indicated by an arrow in FIGS. 2 to 4 and is embodied in such a way that a piston 9 is movable with little play in the oil reservoir 7. The oil reservoir 7 has diametrically opposed openings 11 in its cylindrical wall 10. Oil can flow through them from the oil reservoir 7 into the oil tank 3 after a defined piston travel has been reached.

The piston 9 is prestressed by means of a spring 12. In the course of steering movements the piston 9 is lifted by the oil returning via the return line 6 to the oil tank 3 against the spring force of the spring 12, and the oil in the return line 6 is put under pressure by this.

The oil reservoir 7 can be closed by means of a cover 13. It can be seen in FIGS. 2, 3 and 4, that for easy installation and removal this cover 13 is screwed on the oil reservoir 7. The cover 13 is centrally provided with an equalization bore 14.

FIGS. 2 and 4 show how the oil reservoir 7 is installed in the oil tank 3 in order to be able to communicate with the return line 6.

Figure 3:
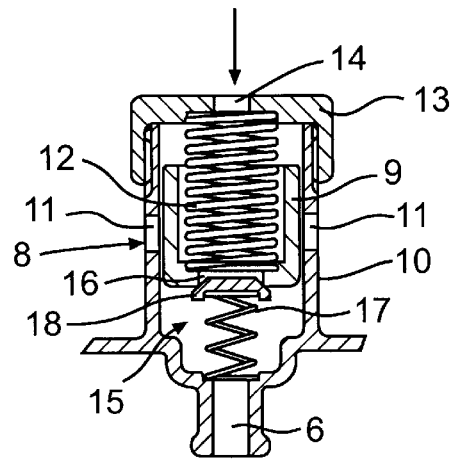
FIG. 3, an individual representation in longitudinal section with the components forming a check valve, and FIG. 4, a longitudinal section through an oil tank with a changed installation of the oil reservoir.

FIG. 3 shows the oil reservoir 7, in which additional components are provided, which form a check valve 15 indicated by an arrow. The bottom of the piston 9 is provided with an opening 16 for this purpose. A valve cone 18, loaded by means of a spring 17, can be pushed as a closure member into this opening 16.

FIG. 4 shows another variant for forming the check valve 15.

In this case a ball 19 is used as the closure member in place of the spring 17 and the valve cone 18.

For this purpose an installation position turned by 180°, i.e. a reversed installation position in comparison with the one shown in FIG. 2, of the oil reservoir 7 including its piston 9 in the oil tank 3 is provided.

Here, the ball 19 acts under its own weight and in this way closes the opening 16. In this case the return line 6 terminates from above in the oil reservoir 7.

A restriction 20 of the return line 6, which can also be a retaining member, is represented in addition in FIG. 4. When underpressure occurs in the return line 6, along with a resultant lifting of the ball 19 for further aspirating oil from the oil reservoir into the return line 6, the restriction or the retaining member 20 prevents the ball 19 from "disappearing" in the return line. This restriction 20 is used as a stop for the ball 19 in the opened position of the check valve wherein, however, it is necessary that sufficient free space remain for the return aspiration of oil out of the oil reservoir 7 into the return line 6.

In place of the restriction it is also possible to employ a pin, not shown in the drawing figure, extending crosswise through the return line 6, as the retaining member.

Figure 1:
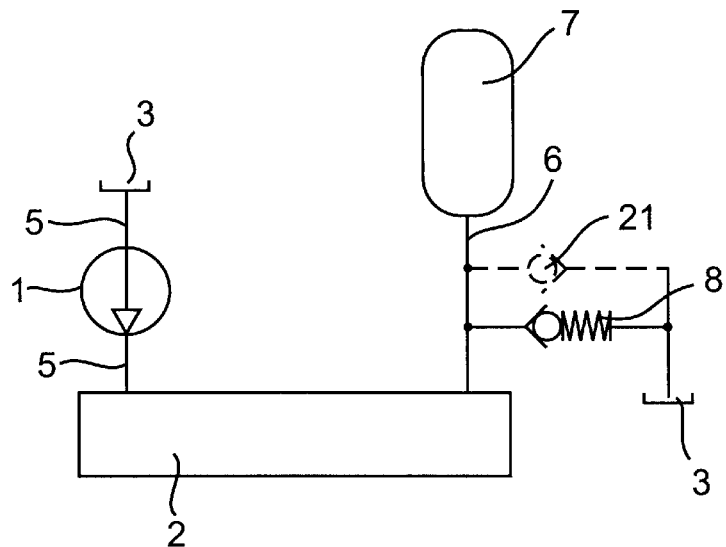
FIG. 1, a circuit arrangement for the essential components of the hydraulic steering arrangement in accordance with the invention.

This check valve is shown in principle by means of the reference numeral 21 in FIG. 1.

The hydraulic steering arrangement operates as follows:

Upon starting the technical system containing the steering device 2, the hydraulic pump 1 is actuated and provides the prerequisite for letting the hydraulic steering arrangement operate.

The hydraulic pump 1 aspirates oil from the pressure-free oil tank 3 and in this way builds up pressure, so that the oil is compressed and gets into the steering device 2 via the supply line 5. It subsequently flows via the return line 6 and the oil reservoir 7 into the oil tank 3. During steering movements the piston 9 is lifted against the spring force of the spring 12 by the oil flowing into the oil tank 3 via the backpressure valve 8.

In the process the oil in the return line 6 is put under pressure.

Once the piston 9 or the bottom of the piston 9 reaches the openings 11 of the cylindrical wall 10 of the oil reservoir 7, the piston 9 is not lifted further. The oil can now flow through the openings 11 into the oil tank 3. In this way there is a predetermined pressure present in the return system, in particular in the return line 6.

The diameters of the openings 11 have been selected such that the oil can reach the oil tank 3 slowly and evenly.

If, because of (too) rapid steering movements, underpressure is created in the cylinder chamber of the steering device 2, oil is pushed back by the spring 12 from the oil reservoir 7 to the steering device 2.

In this way vacuums are prevented which in the extreme case could even hamper a safe steering process. The noise problems are additionally prevented.

Since only small amounts of oil are required, the oil reservoir 7 need have only a small volume. A volume of only approximately 2 to 6 cm$^3$ has been shown to be sufficient.

We claim:

1. A hydraulic steering arrangement with a steering device (2) and an oil tank (3) which are connected with each other via a supply line (5) and a return line (6), wherein a hydraulic pump (1) is integrated into the supply line (5), and wherein an oil reservoir (7) communicating with the return line (6) and a backpressure valve (8), which opens in the direction toward the oil tank (3), are provided, and the backpressure valve (8) is disposed between the oil tank (3) and the oil reservoir (7), characterized in that the oil reservoir (7) is embodied as a piston reservoir with a piston (9) and with prestressing by means of a spring (12).

2. A hydraulic steering arrangement in accordance with claim 1, characterized in that openings (11) to the oil tank (3) result after a defined travel of the piston (9) of the oil reservoir (7).

3. A hydraulic steering arrangement in accordance with claim 1, characterized in that the chamber in which the prestressing spring (12) for the piston (9) is disposed is provided with an equalization bore (14).

4. A hydraulic steering arrangement in accordance with claim 1, characterized in that the oil reservoir (7) is directly integrated into the return line (6).

5. A hydraulic steering arrangement in accordance with claim 1, characterized in that the oil reservoir (7) is disposed in the oil tank (3).

6. A hydraulic steering arrangement in accordance with claim 1, characterized in that the backpressure valve (8) is integrated into the oil reservoir (7).

7. A hydraulic steering arrangement in accordance with claim 2, characterized in that the chamber in which the prestressing spring (12) is disposed is closed off by a cover (13) in which the equalization bore (14) is located.

8. A hydraulic steering arrangement in accordance with claim 1, characterized in that a check valve (15) is installed in the oil reservoir (7).

9. A hydraulic steering arrangement in accordance with claim 8, characterized in that the bottom of the piston (9) is provided with an opening (16) for forming a check valve (15), into which a closure member (18), which is loaded by a spring (17), can be pressed.

10. A hydraulic steering arrangement in accordance with claim 1, characterized in that the oil reservoir (7) is placed on top of the oil tank (3).

11. A hydraulic steering arrangement in accordance with claim 10, characterized in that on its upper front face the piston (9) is provided with an opening (16), which is connected with the return line (6), on which a ball is placed as the closure member.

12. A hydraulic steering arrangement in accordance with claim 13, characterized in that the return line (6) has a restriction or a retaining member (20) upstream of the ball (19).

13. A hydraulic steering arrangement in accordance with claim 14, characterized in that the retaining member (20) is a pin extending crosswise through the return line (6).

* * * * *